(12) United States Patent
Iwasaki et al.

(10) Patent No.: US 7,465,771 B2
(45) Date of Patent: Dec. 16, 2008

(54) PROCESS FOR PRODUCING RADICAL POLYMER AND MICROAPPARATUS FOR CHEMICAL REACTION

(75) Inventors: Takeshi Iwasaki, Chiba (JP); Jun-ichi Yoshida, Osaka (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 136 days.

(21) Appl. No.: 10/565,652

(22) PCT Filed: Jul. 16, 2004

(86) PCT No.: PCT/JP2004/010562

§ 371 (c)(1), (2), (4) Date: Jan. 24, 2006

(87) PCT Pub. No.: WO2005/010055

PCT Pub. Date: Feb. 3, 2005

(65) Prior Publication Data

US 2006/0235170 A1    Oct. 19, 2006

(30) Foreign Application Priority Data

Jul. 25, 2003  (JP)  ............................. 2003-201704
Jan. 27, 2004  (JP)  ............................. 2004-018543

(51) Int. Cl.
  *C08F 2/04*   (2006.01)
  *B01J 19/24*  (2006.01)

(52) U.S. Cl. .................. 526/64; 526/88; 526/920; 422/138; 422/202

(58) Field of Classification Search ................. 422/138, 422/202; 526/64, 88, 920
See application file for complete search history.

(56) References Cited

U.S. PATENT DOCUMENTS

| | | | |
|---|---|---|---|
| 6,399,031 B1 | 6/2002 | Herrmann et al. | |
| 6,555,629 B1 * | 4/2003 | Pysall et al. | ................. 526/64 |
| 2002/0055655 A1 | 5/2002 | Leipprand et al. | |
| 2002/0170976 A1 * | 11/2002 | Bergh et al. | ............... 236/49.1 |
| 2003/0082081 A1 * | 5/2003 | Fouillet et al. | .............. 422/105 |

FOREIGN PATENT DOCUMENTS

| | | |
|---|---|---|
| JP | 7-25908 | 1/1995 |
| JP | 2002-512272 | 4/2002 |
| JP | 2002-544309 | 12/2002 |
| JP | 2003-200041 | 7/2003 |
| JP | 2004-197083 | 7/2004 |
| WO | WO 03/037501 A1 | 5/2003 |

* cited by examiner

*Primary Examiner*—Fred M Teskin
(74) *Attorney, Agent, or Firm*—Oblon, Spivak, McClelland, Maier & Neustadt, P.C.

(57) ABSTRACT

The present invention provides a method for producing a radical polymer having controlled molecular weight distribution or a narrow molecular weight distribution profile, comprising feeding a radical polymerization initiator and a radical-polymerizable monomer into a reaction tube having an inner diameter of 2 mm or less and performing polymerization in the reaction tube in a homogeneous liquid state under flow conditions. Also provided is a microreactor having a jacket for allowing a temperature-regulating fluid to pass therethrough and a plurality of round tubes which are arranged in parallel in the jacket, each having an inner diameter of 2 mm or less, wherein reaction temperature in the round tubes can be regulated through flowing of the temperature-regulating fluid in the jacket.

10 Claims, 1 Drawing Sheet

PROCESS FOR PRODUCING RADICAL POLYMER AND MICROAPPARATUS FOR CHEMICAL REACTION

TECHNICAL FIELD

The present invention relates to a method for producing a radical polymer (i.e., a polymer produced through radical polymerization) and to a microreactor. More particularly, the invention relates to a method for effectively producing, within a short period of time, a radical polymer having controlled molecular weight distribution or a narrow molecular weight distribution profile, the method including polymerizing a radical-polymerizable monomer under flow conditions by means of a reaction microtube having an inner diameter of 2 mm or less and controlling polymerization temperature to a predetermined value, and to a microreactor which can be fabricated from readily available members without employing a high-level processing technique.

BACKGROUND ART

Recently, interest in microreactors has grown rapidly. The term "microreactor" generally refers to an apparatus which includes fine microchannels having a size of about 1 μm to about 1 mm inside the apparatus and which performs reaction in the microchannels. Microreactors have potential to innovate the chemical industry.

Characteristic features of the aforementioned microreactors in relation to organic synthesis include the following: (1) synthesis can be performed from microamounts of source materials; (2) a large surface area is provided per unit volume (flow); (3) temperature control is remarkably easy; (4) interface reaction can be caused to occur at high efficiency; (5) reaction time, cost, and environmental load can be reduced; (6) reaction can be performed in a sealed system, enabling safe synthesis of toxic and hazardous substances; (7) contamination is prevented by virtue of a small-scale closed system; and (8) mixing, product isolation, and purification can be effectively performed through employment of laminar flow through microchannels.

From the viewpoint of industrial applications, (a) production amount can be potentially elevated through increasing the number (numbering-up) of microchannels while maintaining the dimensions of microchannels unchanged. That is, a step for producing a test intermediate apparatus, which has been conventionally required upon transfer of a laboratory apparatus to a plant, can be eliminated. Therefore, employment of microreactors has the following advantages: (b) a new production process can be immediately inaugurated at low cost; (c) experimental results achieved in the laboratory can be immediately transferred to a plant; and (d) industrial production can be conducted in a small-scale plant.

Some cases in which chemical reaction is performed by means of such a microreactor have been disclosed. For example, disclosed are a method for carrying out chemical reaction (see, for example, Japanese Kohyo Patent Publication No. 2001-521816); production of aldols through employment of a microstructure reaction system (see, for example, Japanese Patent Application Laid-Open (kokai) No. 2002-155007); nitrification in a static micromixer (see, for example, Japanese Kohyo Patent Publication No. 2003-506340); and a method for producing arylboron compounds and alkylboron compounds by means of a microreactor (see, for example, Japanese Patent Application Laid-Open (kokai) No. 2003-128677).

Use of a microreactor in polymerization reaction is also disclosed (see, for example, Anal. Chem., Vol. 74. p. 3112 (2002)). Specifically, polymerization of ethylene is carried out in the presence of a metallocene catalyst under pressurized and laminar flow conditions in a flow path (diameter: 1.27 mm). The above polymerization, which is coordination polymerization employing a metallocene catalyst, is a technique completely different from the radical polymerization of the present invention. A method for producing a radical polymer by use of a micromixer is also disclosed (see, for example, Japanese Kohyo Patent Publication No. 2002-512272). In the method, a radical-polymerizable monomer and a polymerization initiator are mixed by use of a micromixer where mixing is performed in narrow flow paths, followed by polymerization. As a result, formation of a high-molecular weight in the produced polymer is suppressed, and precipitation in the reactor is avoided. A characteristic feature of this technique lies in carrying out mixing of a monomer and an initiator in a microspace, and polymerization per se is performed in a tube reactor having a diameter of some centimeters.

Radical polymerization is an essential technique which enables polymerization of a large number of monomer molecules. Therefore, radical polymerization is widely employed in industry as means for producing a variety of polymers. During radical polymerization, a large amount of reaction heat is generated. Thus, when either the batch method or the continuous method is employed, polymerization is generally performed under mild reaction conditions over a long period of time in order to remove reaction heat, making production efficiency problematically poor. In a conventional polymerization method, reaction heat readily causes unevenness in polymerization temperature at a reaction site. Furthermore, when the polymerization is performed in a continuous manner, the reaction mixture does not readily form laminar flow, resulting in variation in residence time in the reaction site. Thus, the formed polymer readily assumes a mixture of polymers having a variety of molecular weights, which is problematic.

Meanwhile, in fabrication of microreactors, microflow paths are generally produced through a highly elaborate processing technique such as photolithography, etching, or fine mechanical processing. Therefore, difficulty has been encountered in employing microreactors for carrying out chemical reaction.

DISCLOSURE OF THE INVENTION

Under the aforementioned circumstances, an object of the present invention is to provide a method for effectively producing, within a short period of time, a radical polymer having controlled molecular weight distribution or a narrow molecular weight distribution profile, the method including polymerizing a radical-polymerizable monomer. Another object of the invention is to provide a microreactor which can be fabricated from readily available members without employing a high-level processing technique.

The present inventors have carried out extensive studies in order to attain the aforementioned objects, and have found that a radical polymer having a desired molecular weight distribution profile can be effectively produced within a short period of time by means of a reaction microtube having a diameter equal to or less than a certain value serving as a reactor, which microtube realizes remarkably high heat exchange efficiency, easiness in temperature control, predominant laminar flow, and rigorous control of residence time. The inventors have also found that an apparatus having a jacket for allowing a temperature-regulating fluid to pass therethrough and a plurality of round microtubes which are arranged in parallel in the jacket can serve as a microreactor, which is an object of the present invention. The present invention has been accomplished on the basis of these findings.

Accordingly, the present invention is directed to the following.

(1) A method for producing a radical polymer, characterized in that the method comprises feeding a radical polymerization initiator and a radical-polymerizable monomer into a reaction tube having an inner diameter of 2 mm or less and performing polymerization in the reaction tube in a homogeneous liquid state under flow conditions.

(2) A method for producing a radical polymer according to (1) above, wherein the radical polymerization initiator and the radical-polymerizable monomer are mixed before being fed into the reaction tube, and the mixture is fed to the reaction tube.

(3) A method for producing a radical polymer according to (1) or (2) above, wherein the reaction tube has an inner diameter of 1 mm or less.

(4) A method for producing a radical polymer according to any of (1) to (3) above, wherein the reaction tube has a plurality of reaction zones capable of regulating polymerization temperature, and the reaction zones are regulated in terms of temperature, whereby the molecular weight distribution of the formed polymer is controlled.

(5) A method for producing a radical polymer according to (4) above, wherein the reaction tube has a first reaction zone located on a radical polymerization initiator and radical-polymerizable monomer inlet side, and a second reaction zone located on a polymer liquid outlet side; the first reaction zone is maintained at a temperature at which the radical polymerization initiator decomposes; and the second reaction zone is maintained at a temperature at which virtually no decomposition of the radical polymerization initiator occurs within the time during which the initiator passes through the second reaction zone.

(6) A microreactor comprising a jacket for allowing a temperature-regulating fluid to pass therethrough, and a plurality of round tubes which are arranged in parallel in the jacket, each having an inner diameter of 2 mm or less, wherein reaction temperature in the round tubes can be regulated through controlling flow of the temperature-regulating fluid in the jacket.

(7) A microreactor according to (6) above, which has such a structure that the jacket is divided into a plurality of jacket sections in the longitudinal direction of the round tubes, and the flow of temperature-regulating liquid in each jacket section can be controlled independently.

(8) A microreactor according to (6) or (7) above, wherein the round tubes are detachably attached to a main body of the jacket.

The present invention provides a method for effectively producing, within a short period of time, a radical polymer having controlled molecular weight distribution or a narrow molecular weight distribution profile, the method including polymerizing a radical-polymerizable monomer under flow conditions by means of a reaction microtube having an inner diameter of 2 mm or less and controlling polymerization temperature to a predetermined value.

The invention also provides a microreactor which can be fabricated from readily available members without employing a high-level processing technique.

BEST MODES FOR CARRYING OUT THE PRESENT INVENTION

Figure 1:
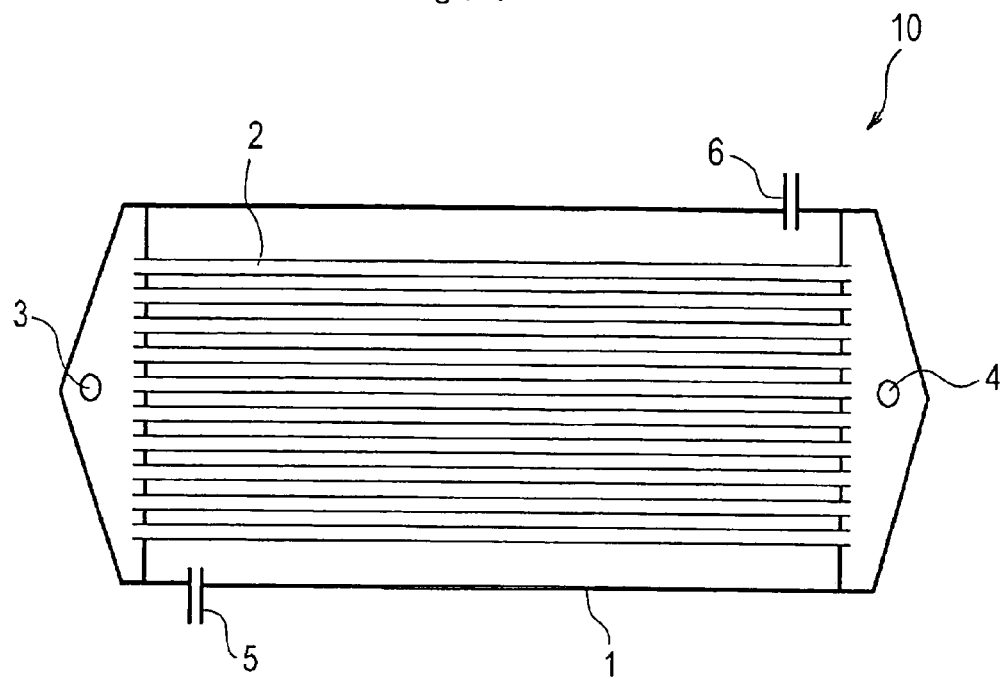
FIG. 1 is a schematic cross-sectional view of one exemplary reactor for carrying out the method of the present invention.

The reactor employed in the method of the present invention for producing a radical polymer is a reaction microtube having an inner diameter of 2 mm or less, preferably 1 mm or less, more preferably 10 to 500 μm, which is a type of microreactor. No particular limitation is imposed on the length of the reactor, and the length is generally 0.01 to 100 m, preferably 0.05 to 50 m, more preferably 0.1 to 10 m.

In the present invention, a radical polymerization initiator and a radical-polymerizable monomer are fed into the aforementioned reaction microtube, and polymerization is performed in the reaction tube in a homogeneous liquid state under flow conditions.

No particular limitation is imposed on the type of the radical-polymerizable monomer serving as raw material, so long as the monomer is radical-polymerazable. Examples of the radical-polymerizable monomer include olefins such as ethylene, propylene, and isobutylene; unsaturated monocarboxylic acids such as acrylic acid and methacrylic acid; unsaturated polycarboxylic acids and acid anhydrides thereof such as maleic acid, fumaric acid, maleic anhydride, and itaconic acid; (meth)acrylate esters such as methyl acrylate, ethyl acrylate, butyl acrylate, 2-ethylhexyl acrylate, dodecyl acrylate, 2-hydroxyethyl acrylate, methyl methacrylate, ethyl methacrylate, butyl methacrylate, 2-ethylhexyl methacrylate, dodecyl methacrylate, and 2-hydroxyethyl methacrylate, dialkylaminoalkyl(meth)acrylates and addition salts thereof such as dimethylaminoethyl acrylate, dimethylaminoethyl methacrylate, dimethylaminoethyl acrylate hydrochloride, dimethylaminoethyl methacrylate hydrochloride, dimethylaminoethyl acrylate p-toluenesulfonic acid salt, and dimethylaminoethyl methacrylate p-toluenesulfonic acid salt; acrylamide monomers such as acrylamide, methacrylamide, N-methylolacrylamide, N,N-dimethylacrylamide, acrylamido-2-methylpropanesulfonic acid, and a sodium salt thereof; styrene monomers such as styrene, α-methylstyrene, p-styrenesulfonic acid, and a sodium salt and a potassium thereof; and other water-soluble and oil-soluble monomers such as allylamine and addition salts thereof, vinyl acetate, acrylonitrile, methacrylonitrile, N-vinylpyrrolidone, and fluorine-containing monomers (e.g., vinyl fluoride, vinylidene fluoride, and tetrafluoroethylene). These monomers may be used singly or in combination of two or more species.

In the present invention, polymerization solvent may be used in accordance with needs, in order to perform polymerization in a homogeneous liquid state in a microtube. The polymerization solvent is appropriately selected from aqueous solvent and organic solvents, in accordance with the type of the employed radical-polymerizable monomer(s). Examples the aqueous solvent include water and mixtures of water and an organic solvent miscible with water. Examples of such organic solvents include organic acids such as formic acid, acetic acid, and propionic acid; esters such as methyl acetate and ethyl acetate; ketones such as acetone, methyl ethyl ketone, diethyl ketone, and methyl isobutyl ketone;

alcohols such as methanol, ethanol, and propanol; dimethyl sulfoxide; and dimethylformamide.

Examples of the aforementioned organic solvent include the aforementioned organic solvents miscible with water; esters; ketones; alcohols; ethers such as diethyl ether and tetrahydrofuran; aliphatic and alicyclic hydrocarbons such as hexane, cyclohexane, heptane, and octane; aromatic hydrocarbons such as benzene, toluene, xylene, and ethylbenzene; and chlorinated hydrocarbons such as methylene chloride, dichloroethane, chloroform, tetrachlorocarbon, chlorobenzene, and dichlorobenzene. These organic solvents may be used singly or in combination of two or more species.

No particular limitation is imposed on the type of the radical polymerization initiator, and the initiator may be appropriately selected from known radical polymerization initiators conventionally employed in radical polymerization in accordance with the type of starting radical-polymerizable monomers and polymerization solvents. Examples of the radical polymerization initiator include organic peroxides, azo compounds, disulfide compounds, redox initiators, and persulfate salts. Generally, when the polymerization solvent is an aqueous medium, an aqueous organic peroxide, an aqueous azo compound, a redox initiator, a persulfate salt, etc. are preferably used, whereas when the polymerization solvent is an organic solvent, an oil-soluble organic peroxide and an oil-soluble azo compound are preferably used.

Examples of the aqueous organic peroxide include t-butyl hydroperoxide, cumene hydroperoxide, diisopropylbenzene hydroperoxide, p-menthane hydroperoxide, 2,5-dimethylhexane-2,5-dihydroperoxide, and 1,1,3,3-tetramethyl hydroperoxide. Examples of the aqueous azo compound include 2,2'-diamidinyl-2,2'-azopropane monohydrochloride, 2,2'-diamidinyl-2,2'-azobutane monohydrochloride, 2,2'-diamidinyl-2,2'-azopentane monohydrochloride, and 2,2'-azobis(2-methyl-4-diethylamino)butyronitrile hydrochloride.

Examples of the redox initiator include a combination of hydrogen peroxide-reducing agent. Examples of the reducing agent employed in the combination include metal ions such as divalent iron ion, copper ion, zinc ion, cobalt ion, and vanadium ion; ascorbic acid; and reducing sugar. Examples of the persulfate salt include ammonium persulfate and potassium persulfate.

These aqueous radical initiators may be used singly or in combination of two or more species.

Examples of the oil-soluble organic peroxide include diacyl peroxides such as dibenzoyl peroxide, di-3,5,5-trimethylhexanoyl peroxide, and dilauroyl peroxide; peroxydicarbonates such as diisopropyl peroxydicarbonate, di-sec-butyl peroxydicarbonate, and di-2-ethylhexyl peroxydicarbonate; peroxy esters such as t-butyl peroxypivalate and t-butylperoxyneodecanoate; acetylcyclohexylsulfonyl peroxide; and disuccinic acid peroxide. Examples of the oil-soluble azo compound include 2,2'-azobisisobutyronitrile, 2,2'-azobis-2-methylbutyronitrile, and 2,2'-azobis(2,4-dimethylvaleronitrile. These oil-soluble radical initiators may be used singly or in combination of two or more species.

In the present invention, the amount of the aforementioned radical polymerization initiator(s) is appropriately selected in accordance with the type of radical-polymerizable monomers and radical polymerization initiators employed, the target molecular weight of the produced polymer, etc. The amount is generally 0.0001 to 0.5 parts by mass on the basis of 100 parts by mass of the radical-polymerizable monomer(s), preferably 0.001 to 0.1 parts by mass.

In the present invention, a chain transfer agent may be employed in accordance with needs. No particular limitation is imposed on the type of the chain transfer agent so long as it does not inhibit polymerization and can regulate molecular weight of the formed polymer, and mercaptans and α-methylstyrene dimer are preferably used. Examples of the mercaptans include 1-butanethiol, 2-butanethiol, 1-octanethiol, 1-dodecanethiol, 2-methyl-2-heptanethiol, 2-methyl-2-undecanethiol, 2-methyl-2-propanethiol, mercaptoacetic acid and esters thereof, 3-mercaptopropionic acid and esters thereof, and 2-mercaptoethanol and esters thereof. These chain transfer agents may be used singly or in combination of two or more species.

In the present invention, the following reaction modes may be employed. In mode (1), a reaction microtube serves as a single reaction zone having uniform temperature. In mode (2), a reaction tube has a plurality of reaction zones capable of regulating polymerization temperature, and the temperature of each reaction zone is regulated. The following modes for feeding a radical polymerization initiator and a radical-polymerizable monomer to a reaction microtube may be employed. In mode (a), a raw material liquid which has been prepared in advance and which contains a radical polymerization initiator and a radical-polymerizable monomer is fed to a reaction microtube. In mode (b), a radical polymerization initiator and a radical-polymerizable monomer are mixed together before being fed to a reaction microtube, and the mixture is fed to the reaction microtube.

In the case of the above reaction mode (1), a reactor shown in FIG. 1 may be employed. FIG. 1 is a schematic cross-sectional view of one exemplary reactor for carrying out the method of the present invention. In FIG. 1, a reactor 10 has a structure in which a plurality of reaction microtubes 2 each having an inner diameter of 2 mm or less are arranged in parallel in a jacket 1. A raw material liquid (containing a radical polymerization initiator, a radical-polymerizable monomer, and a polymerization medium and a chain transfer agent, which are optionally employed in accordance with needs) is fed through an inlet 3, and undergoes polymerization during passage through the reaction microtubes 2. The resultant polymer liquid is discharged through an outlet 4. Temperature-regulating fluid (hereinafter may be referred to as "heat medium") is fed through an inlet 5 of the jacket 1 and discharged through an outlet 6.

The above type of reactor, employing reaction microtubes, ensures a large surface area per unit volume, thereby attaining remarkably high heat exchange efficiency and readily controlling temperature of the reaction zone. In addition, hot spots (locally heated portions), which would otherwise appear due to exothermal reaction during polymerization, tend not to form. Therefore, the entire reaction zone can be maintained at a uniform temperature. The above heat medium is regulated to a temperature equal to or higher than the decomposition temperature of the employed polymerization inhibitor.

In the case where such a reactor is employed, a radical polymerization inhibitor and a radical-polymerizable monomer may be introduced in the aforementioned mode (a) or mode (b). When mode (a) is employed, a raw material liquid is prepared by uniformly mixing a radical polymerization initiator, a radical-polymerizable monomer, and a polymerization medium and a chain transfer agent, which are optionally employed in accordance with needs, and the resultant liquid is fed to the reactor 10 through the inlet 3. When mode (b) is employed, a liquid containing a radical polymerization inhibitor and a liquid containing a radical-polymerizable monomer are intermingled on the upstream side and in the vicinity of the inlet 3, and then fed through the inlet 3.

In the aforementioned mode (2), a reaction tube has a plurality of reaction zones capable of regulating polymerization temperature, and the temperature of each reaction zone is accurately regulated so that the formed polymer has a desired molecular weight distribution. For example, the reaction tube has two reaction zones, and the aforementioned mode (b) is employed. In this case, a first reaction zone (on the side of an inlet for a radical polymerization initiator and a radical-polymerizable monomer) is maintained at a temperature at which the radical polymerization initiator decomposes, and a second reaction zone (on a polymer liquid outlet side) is maintained at a temperature lower than the inlet side temperature, whereby percent decomposition of the radical polymerization initiator in the outlet side reaction zone is regulated to a lower value as compared with the inlet side reaction zone. As a result, a polymer exhibiting two sharp peaks in the molecular weight distribution profile can be produced. Alternatively, in the case where the reaction tube has two reaction zones, and the aforementioned mode (b) is employed, the first reaction zone (on the side of an inlet for a radical polymerization initiator and a radical-polymerizable monomer) is maintained at a temperature at which the radical polymerization initiator decomposes, and the second reaction zone (on a polymer liquid outlet side) is maintained at a temperature at which virtually no decomposition of the radical polymerization initiator occurs within the time during which the initiator passes through the second reaction zone. In this case, a polymer exhibiting substantially one sharp peak in the molecular weight distribution profile can be produced. The term "a temperature at which virtually no decomposition of the radical polymerization initiator occurs" refers to a temperature at which percent decomposition of the radical polymerization initiator is controlled to about 1% or less.

Figure 2:
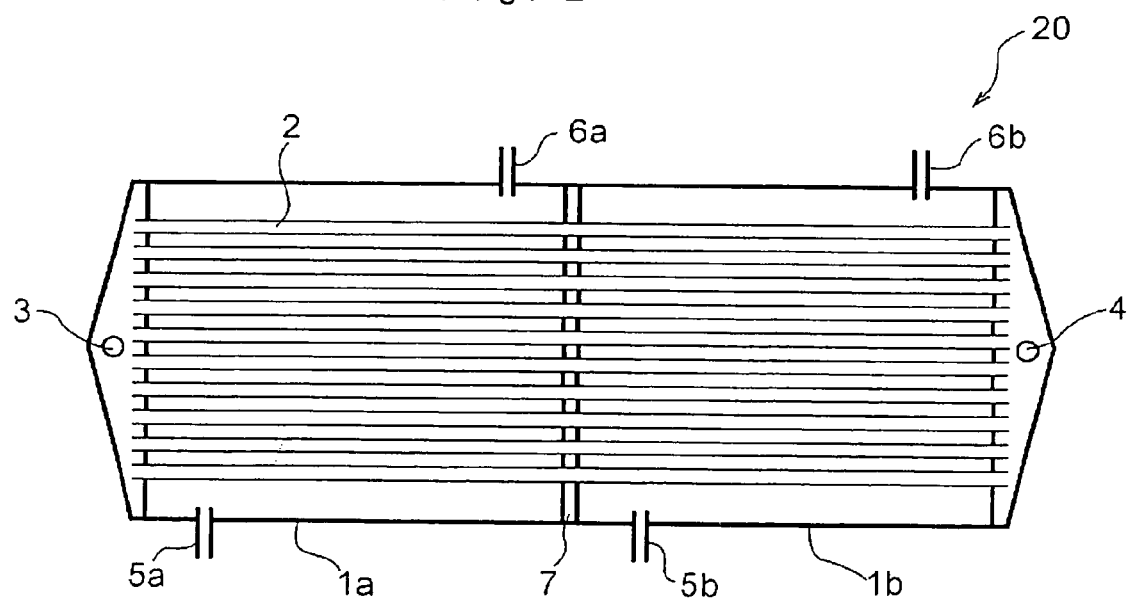
FIG. 2 is a schematic cross-sectional view of another exemplary reactor for carrying out the method of the present invention.

FIG. 2 is a schematic cross-sectional view of another exemplary reactor for carrying out the method of the present invention. In FIG. 2, a reactor 20 has a structure in which a plurality of reaction microtubes 2 each having an inner diameter of 2 mm or less are arranged in parallel in a jacket, which has been divided into jacket sections 1a and 1b by the mediation of a thermal insulator section 7. A raw material liquid (containing a radical polymerization initiator, a radical-polymerizable monomer, and a polymerization medium and a chain transfer agent, which are optionally employed in accordance with needs) is fed through an inlet 3 in the aforementioned mode (a) or (b), and undergoes polymerization during passage through the reaction microtubes 2. The resultant polymer liquid is discharged through an outlet 4. In the jacket section 1a, a heat medium is fed through an inlet 5a and discharged through an outlet 6a, while in the jacket section 1b, a heat medium is fed through an inlet 5b and discharged through an outlet 6b. The heat mediums fed to the jacket sections 1a and 1b are controlled to temperatures different from each other. For example, the heat medium fed to the jacket section 1a is controlled to a temperature at which the radical polymerization initiator decomposes, whereas the heat medium fed to the jacket section 1b is controlled to a predetermined temperature so that the temperature of the relevant reaction zone is regulated to be lower than that of the upstream side reaction zone.

The present invention also provides a microreactor having a jacket for allowing a temperature-regulating fluid to pass therethrough, and a plurality of round tubes which are arranged in parallel in the jacket, each having an inner diameter of 2 mm or less, wherein reaction temperature in the round tubes can be regulated through controlling flow of the temperature-regulating fluid in the jacket.

An example of such a reactor has a structure as shown in FIG. 1. The microreactor can be readily fabricated from round tubes having an inner diameter of 2 mm or less, which are commercially available products, without employing a high-level processing technique such as photolithography, etching, or fine mechanical processing. Examples of the material of the round tubes include metals and alloys, glass, and plastic materials.

The microreactor of the present invention may have such a structure that the jacket is divided in the longitudinal direction of the round tubes into a plurality of jacket sections, and the flow of the temperature-regulating liquid in each jacket section can be independently controlled. An example of such a reactor has a structure as shown in FIG. 2. In FIG. 2, the jacket is divided into two jacket sections.

In the microreactor of the present invention, preferably, the round tubes are detachably attached to a main body of the jacket. Through employment of the structure, round tubes can be replaced, in the event the round tubes are plugged or the inner diameter of the round tube is modified.

In the microreactor of the present invention, the shape, location, number, etc, of the reaction microtubes are not particularly limited to the features shown in FIGS. 1 and 2, and any reaction microtubes which exert the effects of the present invention may be employed. The same applies to the shape and other properties of the jacket.

EXAMPLES

The present invention will next be described in more detail by way of examples, which should not be construed as limiting the invention thereto.

Example 1

Anhydrous toluene was bubbled with argon for 30 minutes or longer. 2,2'-Azobisisobutyronitrile (1.55 g) was dissolved in the thus-treated toluene (100 mL), to thereby prepare a radical polymerization initiator solution. Methyl methacrylate was washed three times with a 1-mol/L sodium hydroxide aqua solution and three times with distilled water and dried over sodium sulfate, followed by bubbling with argon for 30 minutes or longer. The radical polymerization initiator solution and methyl methacrylate were charged into individual syringe pumps under argon, and intermingled by means of a three-way joint. The mixture was fed to a reaction tube (inner diameter: 0.5 mm, length 10 m) made of stainless steel. The portion (9 m in length) of the reaction tube on the upstream side was immersed in a thermostat bath at 100° C., and the other portion (1 m in length) was immersed in an ice bath. The formed polymer solution was collected by means of a measuring cylinder so as to determine flow rate of the polymer solution discharged through the outlet of the reaction tube.

The radical polymerization initiator solution and methyl methacrylate were fed to the reaction tube by means of the syringe pumps such that the flow contained the two components in an equiamount. Through reaction for 3 minutes, a polymer solution (10.8 mL) was collected. The solvent of the polymer solution was distilled out, to thereby yield 0.4062 g of solid containing methyl-methacrylate polymer. The total mass of the radical polymerization initiator which had been flowed in the tube was subtracted from the mass of the obtained solid, and the difference was divided by the total mass of methyl methacrylate (density: 0.945 g/mL) which had been flowed in the tube. Through this calculation, the yield of the polymer was found to be 6.8%.

Number average molecular weight (Mn) and weight average molecular weight (Mw) were determined through gel permeation chromatography (GPC). Sample analysis was performed in the following manner. Specifically, two columns (Shodex K-804L and Shodex K-805L) were connected in series, and development was performed at 40° C. using chloroform serving as a solvent. Detection was performed by means of an RI detector, and calibration was performed on the basis of commercial methyl methacrylate polymer as a standard sample.

Table 1 shows reaction time, yield, number average molecular weight (Mn), and molecular weight distribution factor (Mw/Mn). The obtained polymer exhibited a single peak in the molecular weight distribution profile.

Example 2

The procedure of Example 1 was repeated, except that a polymer solution (5.4 mL) was recovered through reaction for 3 minutes, to thereby yield 0.3577 g of solid containing methyl methacrylate polymer. The results of the reaction are shown in Table 1. The obtained polymer exhibited a single peak in the molecular weight distribution profile.

Example 3

The procedure of Example 1 was repeated, except that a polymer solution (5.3 mL) was recovered through reaction for 6 minutes, to thereby yield 0.6897 g of solid containing methyl methacrylate polymer. The results of the reaction are shown in Table 1. The obtained polymer exhibited a single peak in the molecular weight distribution profile.

Example 4

The procedure of Example 1 was repeated, except that a polymer solution (2.2 mL) was recovered through reaction for 6 minutes, to thereby yield 0.5213 g of solid containing methyl methacrylate polymer. The results of the reaction are shown in Table 1. The obtained polymer exhibited a single peak in the molecular weight distribution profile.

Example 5

The procedure of Example 1 was repeated, except that a polymer solution (2.1 mL) was recovered through reaction for 12 minutes, to thereby yield 0.7699 g of solid containing methyl methacrylate polymer. The results of the reaction are shown in Table 1. The obtained polymer exhibited a single peak in the molecular weight distribution profile.

Example 6

The procedure of Example 1 was repeated, except that a polymer solution (2.6 mL) was recovered through reaction for 17 minutes, to thereby yield 1.0565 g of solid containing methyl methacrylate polymer. The results of the reaction are shown in Table 1. The obtained polymer exhibited a single peak in the molecular weight distribution profile.

Comparative Example 1

The toluene and methyl methacrylate, which had been subjected to preliminary treatment as employed in Example 1, were used. A reaction solution was prepared by mixing 2,2'-azobisisobutyronitrile (0.463 g) and methyl methacrylate (30 mL) in toluene (30 mL) under argon. The reaction solution (15 mL) was transferred to a sealable reaction vessel made of stainless steel under argon, and the vessel was immersed in a thermostat bath at 100° C. for three minutes for polymerization. The polymerization was terminated by immersing the vessel in an ice bath. The reaction solution was removed from the vessel, and the solvent was distilled out from the reaction solution, to thereby yield 0.5818 g of solid containing methyl methacerylate polymer. The results of the reaction are shown in Table 1. The obtained polymer exhibited a single peak in the molecular weight distribution profile.

Comparative Example 2

The procedure of Comparative Example 1 was repeated, except that polymerization in a thermostat bath at 100° C. was performed for 5 minutes, to thereby yield 1.4615 g of solid containing methyl methacrylate polymer. The results of the reaction are shown in Table 1. The obtained polymer exhibited a single peak in the molecular weight distribution profile.

Comparative Example 3

The procedure of Comparative Example 1 was repeated, except that polymerization in a thermostat bath at 100° C. was performed for 7.5 minutes, to thereby yield 3.6198 g of solid containing methyl methacrylate polymer. The results of the reaction are shown in Table 1. The obtained polymer exhibited a single peak in the molecular weight distribution profile.

Comparative Example 4

The procedure of Comparative Example 1 was repeated, except that polymerization in a thermostat bath at 100° C. was performed for 10 minutes, to thereby yield 4.9344 g of solid containing methyl methacrylate polymer. The results of the reaction are shown in Table 1. The obtained polymer exhibited a single peak in the molecular weight distribution profile.

Comparative Example 5

The procedure of Comparative Example 1 was repeated, except that polymerization in a thermostat bath at 100° C. was performed for 15 minutes, to thereby yield 5.5280 g of solid containing methyl methacrylate polymer. The results of the reaction are shown in Table 1. The obtained polymer exhibited a single peak in the molecular weight distribution profile.

TABLE 1

| Reaction mode | Reaction time (min) | Yield (%) | No. av. mol. wt. (Mn) | Mol. wt. distribution (Mw/Mn) |
|---|---|---|---|---|
| Ex. 1 | Tube (ID: 0.5 mm) | 0.49 | 6.8 | $8.6 \times 10^3$ | 1.84 |
| Ex. 2 | | 0.98 | 12.4 | $8.6 \times 10^3$ | 1.8 |
| Ex. 3 | | 2 | 25.9 | $8.4 \times 10^3$ | 1.82 |
| Ex. 4 | | 4.8 | 48.5 | $8.5 \times 10^3$ | 1.83 |
| Ex. 5 | | 10.1 | 76 | $9.1 \times 10^3$ | 1.84 |
| Ex. 6 | | 11.5 | 84.8 | $9.5 \times 10^3$ | 1.84 |
| Comp. Ex. 1 | Batch | 3 | 6.6 | $18 \times 10^4$ | 2.51 |
| Comp. Ex. 2 | | 5 | 20.6 | $1.3 \times 10^4$ | 2.21 |
| Comp. Ex. 3 | | 7.5 | 49.7 | $7.8 \times 10^3$ | 2.26 |
| Comp. Ex. 4 | | 10 | 68 | $7.0 \times 10^3$ | 2.26 |
| Comp. Ex. 5 | | 15 | 76.7 | $7.4 \times 10^3$ | 2.14 |

Example 7

The procedure of Example 1 was repeated, except that a radical polymerization initiator solution of 2,2'-azobisisobutyronitrile (0.3264 g) in toluene (100 mL) and a monomer solution of methyl methacrylate (21.2 mL) diluted with toluene (78.8 mL) were employed, and a polymer solution (26.5 mL) was recovered through reaction for 15 minutes, to thereby yield 0.1666 g of solid containing methyl methacrylate polymer. The results of the reaction are shown in Table 2. The obtained polymer exhibited a single peak in the molecular weight distribution profile.

Example 8

The procedure of Example 7 was repeated, except that a polymer solution (10.0 mL) was recovered through reaction for 29 minutes, to thereby yield 0.2355 g of solid containing methyl methacrylate polymer. The results of the reaction are shown in Table 2. The obtained polymer exhibited a single peak in the molecular weight distribution profile.

Example 9

The procedure of Example 7 was repeated, except that a polymer solution (9.8 mL) was recovered through reaction for 43 minutes, to thereby yield 0.2970 g of solid containing methyl methacrylate polymer. The results of the reaction are shown in Table 2. The obtained polymer exhibited a single peak in the molecular weight distribution profile.

Example 10

The procedure of Example 7 was repeated, except that a polymer solution (5.0 mL) was recovered through reaction for 29 minutes, to thereby yield 0.1754 g of solid containing methyl methacrylate polymer. The results of the reaction are shown in Table 2. The obtained polymer exhibited a single peak in the molecular weight distribution profile.

Example 11

The procedure of Example 7 was repeated, except that a polymer solution (7.1 mL) was recovered through reaction for 48 minutes, to thereby yield 0.2763 g of solid containing methyl methacrylate polymer. The results of the reaction are shown in Table 2. The obtained polymer exhibited a single peak in the molecular weight distribution profile.

Example 12

The procedure of Example 7 was repeated, except that a polymer solution (6.0 mL) was recovered through reaction for 51 minutes, to thereby yield 0.2632 g of solid containing methyl methacrylate polymer. The results of the reaction are shown in Table 2. The obtained polymer exhibited a single peak in the molecular weight distribution profile.

Comparative Example 6

The procedure of Comparative Example 1 was repeated, except that a reaction solution containing 2,2'-azobisisobutyronitrile (0.0985 g) and methyl methacrylate (6.4 mL) in toluene (53.6 mL) was used, and polymerization in a thermostat bath at 100° C. was performed for 5 minutes, to thereby yield 0.1082 g of solid containing-methyl methacrylate polymer. The results of the reaction are shown in Table 2. The obtained polymer exhibited a single peak in the molecular weight distribution profile.

Comparative Example 7

The procedure of Comparative Example 6 was repeated, except that polymerization in a thermostat bath at 100° C. was performed for 7.5 minutes, to thereby yield 0.2418 g of solid containing methyl methacrylate polymer. The results of the reaction are shown in Table 2. The obtained polymer exhibited a single peak in the molecular weight distribution profile.

Comparative Example 8

The procedure of Comparative Example 6 was repeated, except that polymerization in a thermostat bath at 100° C. was performed for 10 minutes, to thereby yield 0.3287 g of solid containing methyl methacrylate polymer. The results of the reaction are shown in Table 2.

Comparative Example 9

The procedure of Comparative Example 6 was repeated, except that polymerization in a thermostat bath at 100° C. was performed for 15 minutes, to thereby yield 0.5018 g of solid containing methyl methacrylate polymer. The results of the reaction are shown in Table 2. The obtained polymer exhibited a single peak in the molecular weight distribution profile.

Comparative Example 10

The procedure of Comparative Example 6 was repeated, except that polymerization in a thermostat bath at 100° C. was performed for 20 minutes, to thereby yield 0.6307 g of solid containing methyl methacrylate polymer. The results of the reaction are shown in Table 2. The obtained polymer exhibited a single peak in the molecular weight distribution profile.

TABLE 2

| | Reaction mode | Reaction time (min) | Yield (%) | No. av. mol. wt. (Mn) | Mol. wt. distribution (Mw/Mn) |
|---|---|---|---|---|---|
| Ex. 7 | Tube | 1 | 4.6 | $4.0 \times 10^3$ | 1.54 |
| Ex. 8 | (ID: 0.5 mm) | 5.1 | 21.9 | $4.1 \times 10^3$ | 1.57 |
| Ex. 9 | | 7.8 | 28.6 | $4.5 \times 10^3$ | 1.56 |
| Ex. 10 | | 10.2 | 33.4 | $4.5 \times 10^3$ | 1.51 |
| Ex. 11 | | 11.9 | 37.2 | $4.8 \times 10^3$ | 1.6 |
| Ex. 12 | | 15 | 42.2 | $5.2 \times 10^3$ | 1.6 |
| Comp. Ex. 6 | Batch | 5 | 5.6 | $6.8 \times 10^3$ | 2.01 |
| Comp. Ex. 7 | | 7.5 | 14.5 | $5.6 \times 10^3$ | 1.81 |
| Comp. Ex. 8 | | 10 | 21.9 | $5.3 \times 10^3$ | 1.85 |
| Comp. Ex. 9 | | 15 | 31.8 | $4.9 \times 10^3$ | 1.83 |
| Comp. Ex. 10 | | 20 | 42 | $4.8 \times 10^3$ | 1.82 |

Example 13

The procedure of Example 1 was repeated, except that a radical polymerization initiator solution of 2,2'-azobisisobutyronitrile (1.1461 g) in toluene (100 mL) and n-butyl acrylate instead of methyl methacrylate were employed, and a polymer solution (2.4 mL) was recovered through reaction for 2 minutes, to thereby yield 0.7724 g of solid containing n-butyl acrylate polymer. The yield was calculated from a specific gravity of n-butyl acrylate of 0.894. The results of the reaction are shown in Table 3. The obtained polymer exhibited a single peak in the molecular weight distribution profile.

Example 14

The procedure of Example 13 was repeated, except that a polymer solution (5.2 mL) was recovered through reaction for 6 minutes, to thereby yield 2.0794 g of solid containing n-butyl acrylate polymer. The results of the reaction are shown in Table 3. The obtained polymer exhibited a single peak in the molecular weight distribution profile.

Example 15

The procedure of Example 13 was repeated, except that a polymer solution (1.8 mL) was recovered through reaction for 3 minutes, to thereby yield 0.6909 g of solid containing n-butyl acrylate polymer. The results of the reaction are shown in Table 3. The obtained polymer exhibited a single peak in the molecular weight distribution profile.

Example 16

The procedure of Example 13 was repeated, except that a polymer solution (1.8 mL) was recovered through reaction for 4 minutes, to thereby yield 0.7176 g of solid containing n-butyl acrylate polymer. The results of the reaction are shown in Table 3. The obtained polymer exhibited a single peak in the molecular weight distribution profile.

Example 17

The procedure of Example 13 was repeated, except that a polymer solution (1.8 mL) was recovered through reaction for 5 minutes, to thereby yield 0.7162 g of solid containing n-butyl acrylate polymer. The results of the reaction are shown in Table 3. The obtained polymer exhibited a single peak in the molecular weight distribution profile.

Comparative Example 11

The procedure of Comparative Example 1 was repeated, except that a reaction solution containing 2,2'-azobisisobutyronitrile (0.3438 g) and n-butyl acrylate (30 mL) in toluene (30 mL) was used, to thereby yield 5.5781 g of solid containing n-butyl acrylate polymer. The results of the reaction are shown in Table 3. The obtained polymer exhibited a single peak in the molecular weight distribution profile.

Comparative Example 12

The procedure of Comparative Example 11 was repeated, except that polymerization in a thermostat bath at 100° C. was performed for 3.5 minutes, to thereby yield 5.8455 g of solid containing n-butyl acrylate polymer. The results of the reaction are shown in Table 3. The obtained polymer exhibited a single peak in the molecular weight distribution profile.

Comparative Example 13

The procedure of Comparative Example 11 was repeated, except that polymerization in a thermostat bath at 100° C. was performed for 4 minutes, to thereby yield 5.9772 g of solid containing n-butyl acrylate polymer. The results of the reaction are shown in Table 3. The obtained polymer exhibited a single peak in the molecular weight distribution profile.

TABLE 3

| | Reaction mode | Reaction time (min) | Yield (%) | No. av. mol. wt. ($M_n$) | Mol. wt. distribution ($M_w/M_n$) |
|---|---|---|---|---|---|
| Ex. 13 | Tube | 1.5 | 70.7 | $3.3 \times 10^4$ | 3.63 |
| Ex. 14 | (ID: 0.5 mm) | 2 | 88.1 | $2.6 \times 10^4$ | 3.59 |
| Ex. 15 | | 2.9 | 84.5 | $2.3 \times 10^4$ | 3.14 |
| Ex. 16 | | 3.9 | 87.8 | $2.1 \times 10^4$ | 3.16 |
| Ex. 17 | | 4.9 | 87.7 | $1.9 \times 10^4$ | 3.35 |
| Comp. Ex. 11 | Batch | 3 | 81.9 | $1.0 \times 10^4$ | 9.61 |
| Comp. Ex. 12 | | 3.5 | 85.8 | $9.3 \times 10^3$ | 10 |
| Comp. Ex. 13 | | 4 | 87.8 | $9.3 \times 10^3$ | 10.3 |

Example 18

The procedure of Example 13 was repeated, except that a radical polymerization initiator solution of 2,2'-azobisisobutyronitrile (0.3264 g) in toluene (100 mL) and a monomer solution of n-butyl acrylate (26.1 mL) diluted with toluene (73.9 mL) were employed, and a polymer solution (15.2 mL) was recovered through reaction for 13 minutes, to thereby yield 0.4686 g of solid containing n-butyl acrylate polymer. The results of the reaction are shown in Table 4.

Example 19

The procedure of Example 18 was repeated, except that a polymer solution (19.8 mL) was recovered through reaction for 23 minutes, to thereby yield 0.8418 g of solid containing n-butyl acrylate polymer. The results of the reaction are shown in Table 4. The obtained polymer exhibited a single peak in the molecular weight distribution profile.

Example 20

The procedure of Example 18 was repeated, except that a polymer solution (8.8 mL) was recovered through reaction for 15 minutes, to thereby yield 0.4067 g of solid containing n-butyl acrylate polymer. The results of the reaction are shown in Table 4. The obtained polymer exhibited a single peak in the molecular weight distribution profile.

Example 21

The procedure of Example 18 was repeated, except that a polymer solution (5.3 mL) was recovered through reaction for 15 minutes, to thereby yield 0.3704 g of solid containing n-butyl acrylate polymer. The results of the reaction are shown in Table 4. The obtained polymer exhibited a single peak in the molecular weight distribution profile.

Example 22

The procedure of Example 18 was repeated, except that a polymer solution (4.9 mL) was recovered through reaction for 23 minutes, to thereby yield 0.3761 g of solid containing n-butyl acrylate polymer. The results of the reaction are shown in Table 4. The obtained polymer exhibited a single peak in the molecular weight distribution profile.

Example 23

The procedure of Example 18 was repeated, except that a polymer solution (5.0 mL) was recovered through reaction for 29 minutes, to thereby yield 0.4396 g of solid containing n-butyl acrylate polymer. The results of the reaction are shown in Table 4. The obtained polymer exhibited a single peak in the molecular weight distribution profile.

Comparative Example 14

The procedure of Comparative Example 1 was repeated, except that a reaction solution containing 2,2'-azobisisobutyronitrile (0.0985 g) and n-butyl acrylate (8.6 mL) in toluene (51.4 mL) was used, and polymerization in a thermostat bath at 100° C. was performed for 5 minutes, to thereby yield 0.6825 g of solid containing n-butyl acrylate polymer. The results of the reaction are shown in Table 4. The obtained polymer exhibited a single peak in the molecular weight distribution profile.

Comparative Example 15

The procedure of Comparative Example 14 was repeated, except that polymerization in a thermostat bath at 100° C. was performed for 7 minutes, to thereby yield 0.8720 g of solid containing n-butyl acrylate polymer. The results of the reaction are shown in Table 4. The obtained polymer exhibited a single peak in the molecular weight distribution profile.

Comparative Example 16

The procedure of Comparative Example 14 was repeated, except that polymerization in a thermostat bath at 100° C. was performed for 8 minutes, to thereby yield 0.9894 g of solid containing n-butyl acrylate polymer. The results of the reaction are shown in Table 4. The obtained polymer exhibited a single peak in the molecular weight distribution profile.

Comparative Example 17

The procedure of Comparative Example 14 was repeated, except that polymerization in a thermostat bath at 100° C. was performed for 10 minutes, to thereby yield 1.2662 g of solid containing n-butyl acrylate polymer. The results of the reaction are shown in Table 4. The obtained polymer exhibited a single peak in the molecular weight distribution profile.

Comparative Example 18

The procedure of Comparative Example 14 was repeated, except that polymerization in a thermostat bath at 100° C. was performed for 12 minutes, to thereby yield 1.2070 g of solid containing n-butyl acrylate polymer. The results of the reaction are shown in Table 4. The obtained polymer exhibited a single peak in the molecular weight distribution profile.

TABLE 4

|  | Reaction mode | Reaction time (min) | Yield (%) | No. av. mol. wt. (Mn) | Mol. wt. distribution (Mw/Mn) |
|---|---|---|---|---|---|
| Ex. 18 | Tube | 1.5 | 22.6 | $7.0 \times 10^3$ | 1.91 |
| Ex. 19 | (ID: 0.5 mm) | 2.1 | 31.9 | $6.6 \times 10^3$ | 1.9 |
| Ex. 20 |  | 3 | 34.8 | $6.3 \times 10^3$ | 1.94 |
| Ex. 21 |  | 5 | 53.2 | $5.8 \times 10^3$ | 1.95 |
| Ex. 22 |  | 8.3 | 58.6 | $5.7 \times 10^3$ | 2.02 |
| Ex. 23 |  | 10.2 | 67.3 | $5.2 \times 10^3$ | 2.08 |
| Comp. Ex. 14 | Batch | 5 | 34.2 | $1.3 \times 10^4$ | 6.53 |
| Comp. Ex. 15 |  | 7 | 44.1 | $1.0 \times 10^4$ | 3.33 |
| Comp. Ex. 16 |  | 8 | 50.2 | $8.9 \times 10^3$ | 3.06 |
| Comp. Ex. 17 |  | 10 | 64.6 | $7.9 \times 10^3$ | 3.06 |
| Comp. Ex. 18 |  | 12 | 61.5 | $7.3 \times 10^3$ | 2.93 |

As is clear from Tables 1 to 4, each of the polymers formed through polymerization in which a polymerization initiator and a monomer are fed to the reaction microtube exhibits one single peak in the corresponding molecular weight distribution profile having a narrower peak width as compared with the polymers of the Comparative Examples.

Example 24

Polymerization of methyl methacrylate was performed by means of a reactor (see FIG. 2). In the reactor, 94 tubes (inner diameter: 0.51 mm, length 60 cm) are arranged in parallel in a jacket of a round tube shape, and the jacket is divided into a jacket section of 50 cm and that of 10 cm, whereby different heat media can be flowed in the jacket sections.

A solution of 2,2'-azobisisobutyronitrile in toluene and methyl methacrylate, which had been prepared in a manner similar to that employed in Example 1, were charged into individual syringe pumps under argon, and intermingled by means of a three-way joint. The mixture was fed to the aforementioned reactor. A hot medium at 100° C. was circulated in the jacket section of the 50 cm portion, and a cold medium at 0° C. was circulated in the jacket section of the 10 cm portion. Through this system, the reaction solution was caused to pass the jacket section at 100° C., then cooled to 0° C., and discharged.

The radical polymerization initiator solution and methyl methacrylate were fed to the reaction tube by means of the syringe pumps such that the flow contained the two components in an equiamount. Through reaction for one minute, a polymer solution (8.4 mL) was collected. The solvent of the polymer solution was distilled out, to thereby yield 0.5746 g of solid containing methyl methacrylate polymer. The yield of the polymer, calculated in a manner similar to that of Example 1, was found to be 12.8%.

Number average molecular weight (Mn) and weight average molecular weight (Mw) were determined through gel permeation chromatography (GPC) under the same conditions as employed in Example 1. The number average molecular weight (Mn) and the molecular weight distribution factor (Mw/Mn) were found to be $9.3 \times 10^3$ and 1.84, respectively. The obtained polymer exhibited a single peak in the molecular weight distribution profile.

Reaction conditions of Example 24 were the same as employed in Examples 1 to 5 in which one tube was employed. The volume of the reaction portion employed in Examples 1 to 5 was 1.8 mL, and the reaction portion of the reactor employed in Example 24 was calculated to be 9.6 mL. In Examples 24 and 2, in which polymerization was performed for almost the same reaction time, the yield, molecular weight, and molecular weight distribution factor of the formed polymer were almost equivalent. The fact indicates that through employment of the reactor of Example 24, productivity of the polymer can be elevated to a level in accordance with the increase in reactor volume (about five times), as compared Examples 1 to 5 in which one tube was employed.

INDUSTRIAL APPLICABILITY

According to the method of the present invention for producing a radical polymer, polymerization of a radical-polymerizable monomer is performed under flow conditions by means of a reaction microtube having an inner diameter of 2 mm or less, and polymerization temperature is rigorously controlled to a predetermined value. Thus, a radical polymer having controlled molecular weight distribution or a narrow molecular weight distribution profile can be effectively produced within a short period of time.

Furthermore, the present invention provides a microreactor which can be fabricated from readily available members without employing a high-level processing technique.

The invention claimed is:

1. A method for producing a radical polymer, comprising feeding a radical polymerization initiator and a radical-polymerizable monomer into a reaction tube having an inner diameter of 2 mm or less and performing polymerization in the reaction tube in a homogeneous liquid state under flow conditions.

2. The method for producing a radical polymer according to claim 1, wherein the radical polymerization initiator and the radical-polymerizable monomer are mixed before being fed into the reaction tube, and the mixture is fed to the reaction tube.

3. The method for producing a radical polymer according to claim 1, wherein the reaction tube has an inner diameter of 1 mm or less.

4. The method for producing a radical polymer according to claim 1, wherein the reaction tube has a plurality of reaction zones capable of regulating polymerization temperature, and the reaction zones are regulated in terms of temperature, whereby the molecular weight distribution of the formed polymer is controlled.

5. The method for producing a radical polymer according to claim 4, wherein the reaction tube has a first reaction zone located on a radical polymerization initiator and radical-polymerizable monomer inlet side, and a second reaction zone located on a polymer liquid outlet side; the first reaction zone is maintained at a temperature at which the radical polymerization initiator decomposes; and the second reaction zone is maintained at a temperature at which virtually no decomposition of the radical polymerization initiator occurs within the time during which the initiator passes through the second reaction zone.

6. The method for producing a radical polymer according to claim 2, wherein the reaction tube has an inner diameter of 1 mm or less.

7. The method for producing a radical polymer according to claim 2, wherein the reaction tube has a plurality of reaction zones capable of regulating polymerization temperature, and the reaction zones are regulated in terms of temperature, whereby the molecular weight distribution of the formed polymer is controlled.

8. The method for producing a radical polymer according to claim 3, wherein the reaction tube has a plurality of reaction zones capable of regulating polymerization temperature, and the reaction zones are regulated in terms of temperature, whereby the molecular weight distribution of the formed polymer is controlled.

9. The method for producing a radical polymer according to claim 7, wherein the reaction tube has a first reaction zone located on a radical polymerization initiator and radical-polymerizable monomer inlet side, and a second reaction zone located on a polymer liquid outlet side; the first reaction zone is maintained at a temperature at which the radical polymerization initiator decomposes; and the second reaction zone is maintained at a temperature at which virtually no decomposition of the radical polymerization initiator occurs within the time during which the initiator passes through the second reaction zone.

10. The method for producing a radical polymer according to claim 8, wherein the reaction tube has a first reaction zone located on a radical polymerization initiator and radical-polymerizable monomer inlet side, and a second reaction zone located on a polymer liquid outlet side; the first reaction zone is maintained at a temperature at which the radical polymerization initiator decomposes; and the second reaction zone is maintained at a temperature at which virtually no decomposition of the radical polymerization initiator occurs within the time during which the initiator passes through the second reaction zone.

* * * * *